United States Patent [19]
Berens

[11] Patent Number: 5,454,684
[45] Date of Patent: Oct. 3, 1995

[54] ROLLOUT DUMPING BOX FOR UTILITY VEHICLE

[76] Inventor: Robin H. Berens, 56 Camino Del Diablo, Orinda, Calif. 94563

[21] Appl. No.: 251,270
[22] Filed: May 31, 1994
[51] Int. Cl.⁶ .................. B60P 1/32; B60P 1/52; B60P 1/64
[52] U.S. Cl. .................. 414/522; 414/477; 296/26; 298/12; 298/14
[58] Field of Search .................. 414/469, 477, 414/480, 522, 523; 224/310; 14/71.1, 71.3; 298/12, 14, 1 A; 296/26, 37.6

[56] References Cited

U.S. PATENT DOCUMENTS

| | | | |
|---|---|---|---|
| 1,359,824 | 11/1920 | Mullaney | 414/522 |
| 2,784,027 | 3/1957 | Temp | 296/23 |
| 3,028,025 | 4/1962 | White | 214/84 |
| 3,084,816 | 4/1963 | Bozio | 414/522 |
| 3,381,835 | 5/1968 | Lee | 414/522 X |
| 3,471,045 | 10/1969 | Panciocco | 214/83.24 |
| 3,630,571 | 10/1972 | Saldana | 298/14 |
| 3,768,673 | 10/1973 | Nydam et al. | 214/85.24 |
| 3,915,496 | 10/1975 | Mabry | 298/14 |
| 4,303,367 | 12/1981 | Bott | 414/522 |
| 4,305,695 | 12/1981 | Zachrich | 414/552 |
| 4,681,371 | 7/1987 | Leonard | 298/1 A |
| 4,741,575 | 5/1988 | Sloan | 414/477 X |
| 4,755,097 | 7/1988 | Corompt | 414/499 |
| 4,824,158 | 8/1989 | Peters et al. | 296/37.6 |
| 4,909,558 | 3/1990 | Roshinsky | 296/37.6 |
| 4,909,563 | 3/1990 | Smith | 296/98 |
| 4,950,123 | 8/1990 | Brockhaus | 414/522 |
| 5,052,878 | 10/1991 | Brockhaus | 414/522 |
| 5,064,335 | 11/1991 | Bergeron et al. | 414/522 |
| 5,183,372 | 2/1993 | Dinverno | 414/538 |

FOREIGN PATENT DOCUMENTS

| | | | |
|---|---|---|---|
| 9783 | of 1927 | Australia | 298/12 |
| 2488195 | 2/1982 | France | 414/477 |
| 2619768 | 3/1989 | France | 298/12 |
| 0194633 | 11/1983 | Japan | 298/12 |
| 2105296 | 3/1983 | United Kingdom | 414/522 |

Primary Examiner—Michael S. Huppert
Assistant Examiner—Stephen Gordon
Attorney, Agent, or Firm—George W. Wasson

[57] ABSTRACT

An auxiliary mechanism for use with a utility vehicle. The auxiliary mechanism is adapted to be removably installed within the storage area of the utility vehicle and to be movable into and out of the rear or side of the vehicle to a loading and dumping position. Movement of the auxiliary mechanism is under control of a closed loop cable system and dumping is accomplished under control by a screw jack. Stops register the movable portions of the mechanism for stowed, loading, predumping and dumping positions.

19 Claims, 5 Drawing Sheets

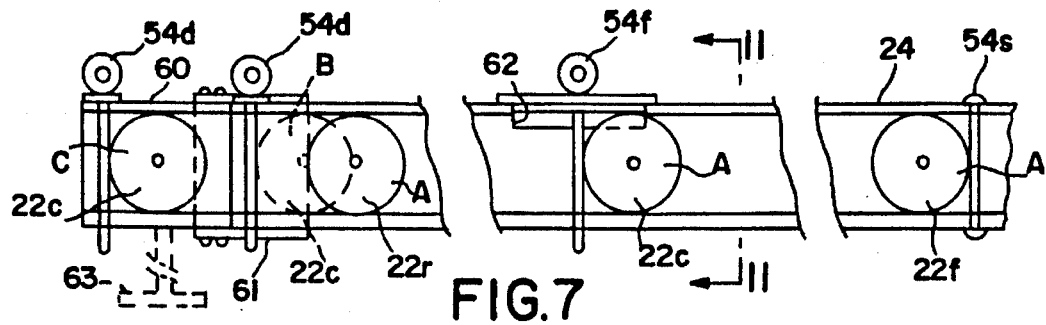
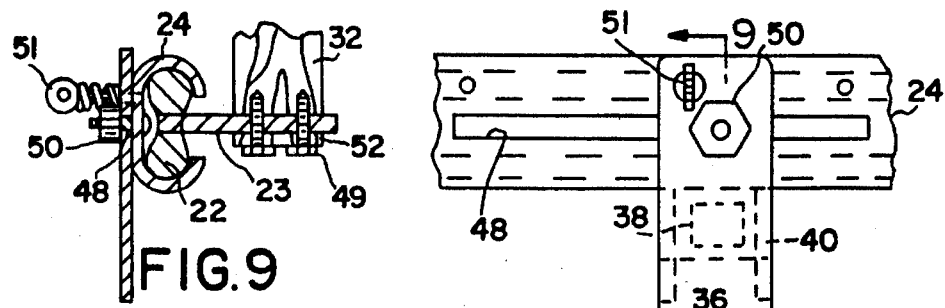
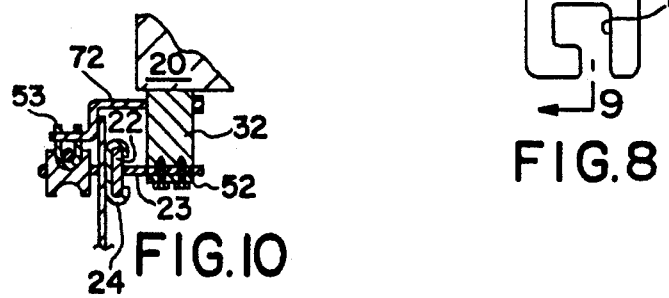
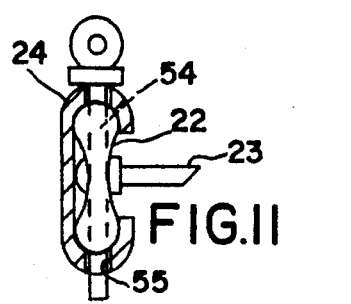
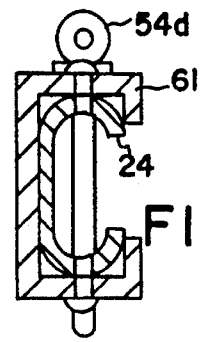
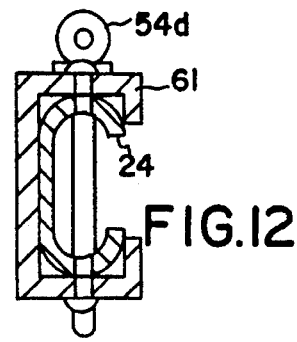
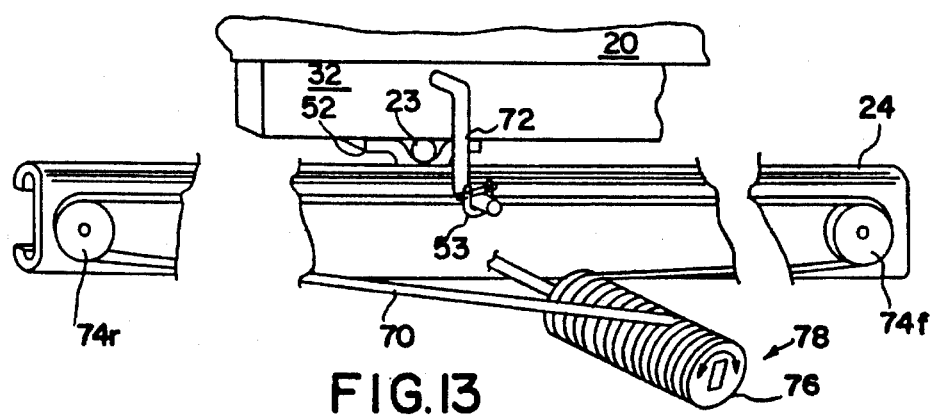

5,454,684

ROLLOUT DUMPING BOX FOR UTILITY VEHICLE

This invention relates to an auxiliary mechanism adapted for installation in a utility vehicle. More particularly the invention relates to an auxiliary mechanism adapted to be removably installed within the storage area of a van or truck or the like and including a support mechanism for rollably supporting and axially moving an assembly within the storage area so as to permit movement of the mechanism into and out of an entry/exit opening at the end or side of a vehicle. The mechanism also is adapted for tipping the movable part of the mechanism to permit dumping of articles supported within the assembly.

BACKGROUND OF THE INVENTION

Utility vehicles today include vehicles such as trucks, vans and enclosed recreational vehicles that have storage or passenger space behind the driver's seat at the rear of the vehicle with access doors from the rear and side. In the case of the vans, there usually are removable passenger seats that, when removed, permit the van to be used for other utility purposes such as hauling articles of many sizes in an area that can be referred to as the storage area. Access to the storage area is through the rear access door or through sliding or hinged side doors, but because the van includes an overhead cover the hauled load must enter through the access doors and not by being directly lowered into the storage area from above. The same conditions apply in the case of a truck that is equipped with a cover for the truck bed area. In some uses of these vehicles it would be desirable to permit materials that are to be hauled to be placed on a movable surface that can then be easily moved into the storage area for transporting and easily moved out of the storage area for loading and unloading. Auxiliary mechanisms for permitting the loading and unloading of articles into a storage area are known.

SUMMARY OF THE INVENTION

The auxiliary mechanism of the present invention is adapted for installation in or on a vehicle of the type just described to permit the vehicle to be used in transporting cargo materials. In its preferred form the mechanism is adapted to be removably installed in the storage area of a van or utility vehicle after the passenger seats have been removed from the area of the vehicle behind the driver's seat. In those vehicles that have removable seats in the storage area passenger seats are usually installed in the vehicle by engaging and locking a portion at the support base for the seats with a slot mechanism in the floor of the storage area of the vehicle. When the seats are removed, the storage area in the vehicle is usually open and accessible from the rear and from the side of the vehicle. The doors at the rear of the vehicle can be vertically hinged doors hinged at the side posts of the entry way, horizontally hinged doors, or tailgates hinged at the top or bottom of the doorway. The usual feature of the van or utility vehicle is that the entry/exit openings to the storage area are unobstructed when the passenger seats have been removed.

The mechanism of the present invention includes a subframe that has support elements that are adapted to engage the locking slot mechanism at the floor of the vehicle that is used for the installation of seats. The subframe supports channel guides or guide rails for sliding or rolling support of a cargo box or container that may include a box or the like for containing cargo articles that are to be hauled. The cargo box or container is adapted to be movable with respect to the floor of the vehicle from a location with at least part of the cargo box or container outside of the vehicle to a location totally within the vehicle. When the cargo box or container is moved to a position within the vehicle the cargo box or container can be secured against movement within the storage area and the doors of the vehicle can be closed. The channel guides are provided with stop mechanisms for locking and limiting the movement of the cargo box with respect to the guides. Further, the channel guides may be adapted for limited movement with respect to the subframe to permit the channels and the cargo box to be placed in a position partially outside of the storage area where the cargo box may be rotated about part of its support within the channel guides in a manner to permit articles to be dumped from the cargo box.

The mechanism of the present invention is adapted to be provided with a self-locking winching mechanism for moving the cargo box with respect to the channel guides to provide positive positioning of the cargo box within the storage area. The winch mechanism is designed to maintain absolute control over the position of the cargo box in either direction of movement and at any location. A further adaptation of the auxiliary mechanism is a positive control of the rotational movement of the cargo box with respect to the channel guides during a dumping operation.

The mechanism may also be used for transporting a wheelchair, or the like, used by handicapped persons; the wheelchair may be ramped into the cargo area, secured in place during transport, and then down ramped for use outside of the vehicle. Also, off-road vehicles of reasonable size, gardening implements, bicycles and strollers, or the like, may be ramped into and out of the utility vehicle with the use of the auxiliary mechanism of the present invention.

One object of the present invention is an auxiliary mechanism for a vehicle having an accessible storage area with the auxiliary mechanism being adapted to be installed into the vehicle and removable from the vehicle with elements that engage existing support stuctures in the vehicle.

A further object of the present invention in accord with the preceeding object is the provision of an auxiliary mechanism that may be slid into and out of a storage area of a utility vehicle for loading and unloading and may be securely locked within the vehicle during movement of the vehicle.

Another object in accord with the preceeding objects is a winching mechanism to provide for self-locking positive positioning of a portion of the auxiliary mechanism with respect to the storage area of the vehicle with a winching mechanism manually or power operated.

Another object in accord with the preceeding objects is an auxiliary mechanism with the addition of means that will permit a portion of the auxiliary mechanism to be rotated with respect to the vehicle about a generally horizontal axis to permit articles to be dumped from the mechanism at the exterior of the vehicle.

Another object in accord with the preceeding objects is a means for adapting the dumping portion of the auxiliary mechanism with a powered dump means.

A further object of the present invention in accord with the preceeding objects is an auxiliary mechanism that may be designed for operation at either an end or a side exit/entry opening.

Further objects and features of the present invention will be readily apparent to those skilled in the art from the appended drawings and specification illustrating a preferred embodiment wherein:

BRIEF DESCRIPTION OF THE DRAWINGS

FIG. 7 is an enlarged side elevational view of one form of a channel guide and the support rollers for the movable cargo box of the present invention and illustrating the location of wheel stops along the channel guide.

FIG. 8 is an enlarged side elevational view of the support bracket for the channel guides in the form of FIGS. 1 and 2 and illustrating an alternative formation in the channel guides of the present invention.

FIG. 9 is a sectional view taken along the lines 9—9 of FIG. 8.

FIG. 10 is a sectional view taken along the lines 10—10 of FIG. 3 and showing one form of connection of the cargo box to the cable drive.

FIG. 11 is a sectional view taken along the lines 11—11 of FIG. 7 and showing one form of a locking stop mechanism.

FIG. 12 is a sectional view taken along the lines 12—12 of FIG. 17.

FIG. 13 is a partial perspective view showing the closed loop cable drive mechanism of the present invention.

DETAILED DESCRIPTION OF THE PREFERRED EMBODIMENT

Figure 1:
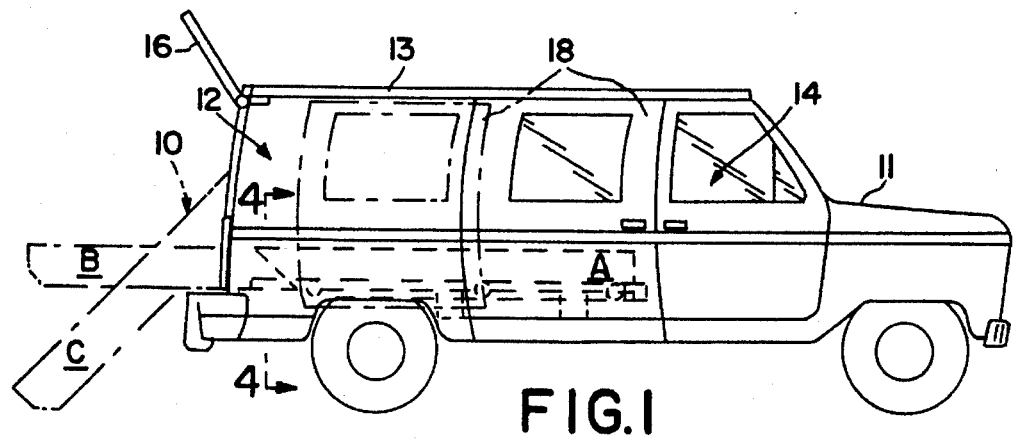
FIG. 1 is side elevational view of a van, utility vehicle or the like showing the auxiliary mechanism of the present invention in phantom lines at a rear opening into the vehicle.
Figure 2:
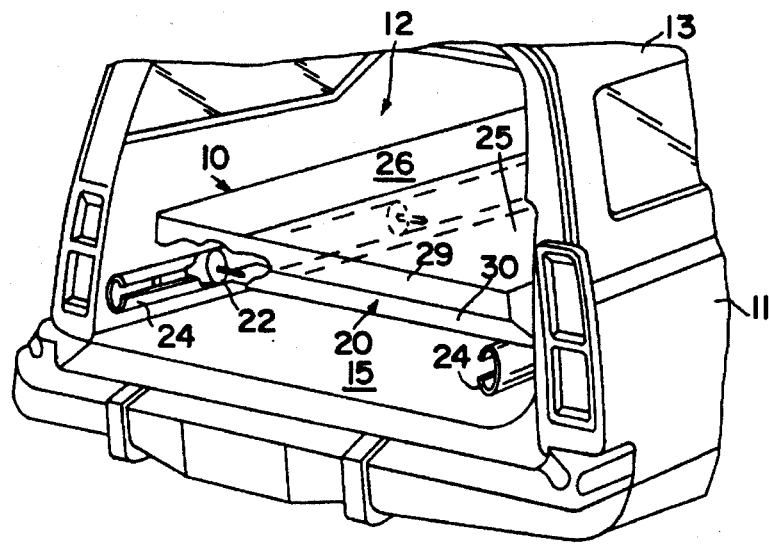
FIG. 2 is a partial perspective view showing the auxiliary mechanism of the present invention within the storage area of a vehicle as in FIG. 1.
Figure 5:
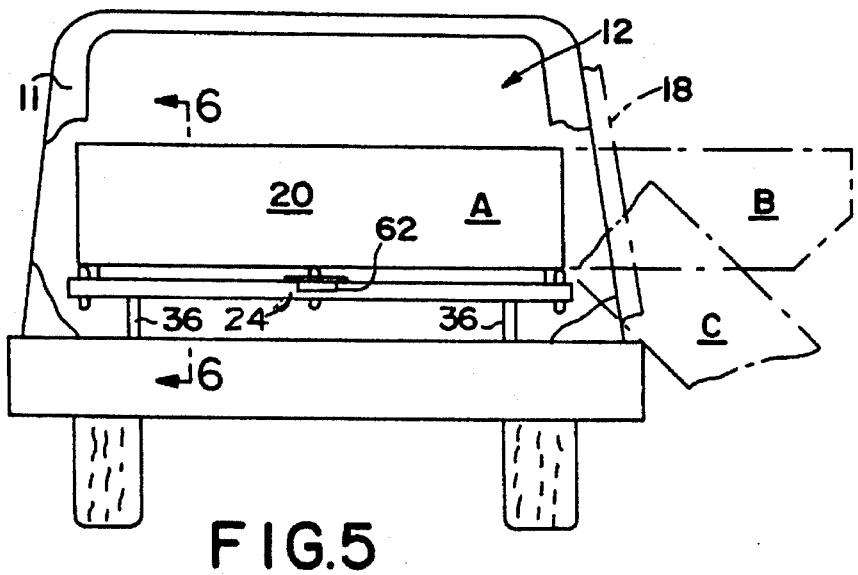
FIG. 5 is a rear elevational view of a vehicle showing the auxiliary mechanism of the present invention in an alternative form for operation into and out of a side door of a vehicle.

The auxiliary mechanism 10 of the present invention is adapted to be used with a vehicle in the form of a truck, van or utility vehicle 11 as represented in FIGS. 1, 2 and 5. Such vehicles usually include a passenger area or storage area 12 behind the driver's area 14 of the vehicle with the storage area enclosed by some form of top or cover 13 and a floor 15 with some form of access to the storage area through entry/exit opening or rear door(s) 16 and usually at side door(s) 18. The actual form of rear or side doors is not a part of the present invention; the rear doors may be side hinged or top or bottom hinged and the side doors may be hinged or sliding. For the purposes of the present invention, the type of vehicle is not important except that the vehicle will have a generally clear storage area 12 within the vehicle that will be accessible from the rear or side when the vehicle doors are opened.

FIG. 1 illustrates in phantom lines the several positions of the auxiliary mechanism of the present invention with position A being the stowed position totally within the vehicle, position B with part of the mechanism of the present invention extending outside of the vehicle to a loading position, and position C with the cargo box part of the mechanism pivoted into a dumping position.

FIG. 2 illustrates the auxiliary mechanism generally in the A stowed position of FIG. 1 totally within the vehicle. As shown in this figure, the auxiliary mechanism 10 includes a cargo box structure 20 supported on rollers or wheels 22 contained and movable within channel guides or guide rails 24 at each side of the storage area 12 of the vehicle 11.

Figure 3:
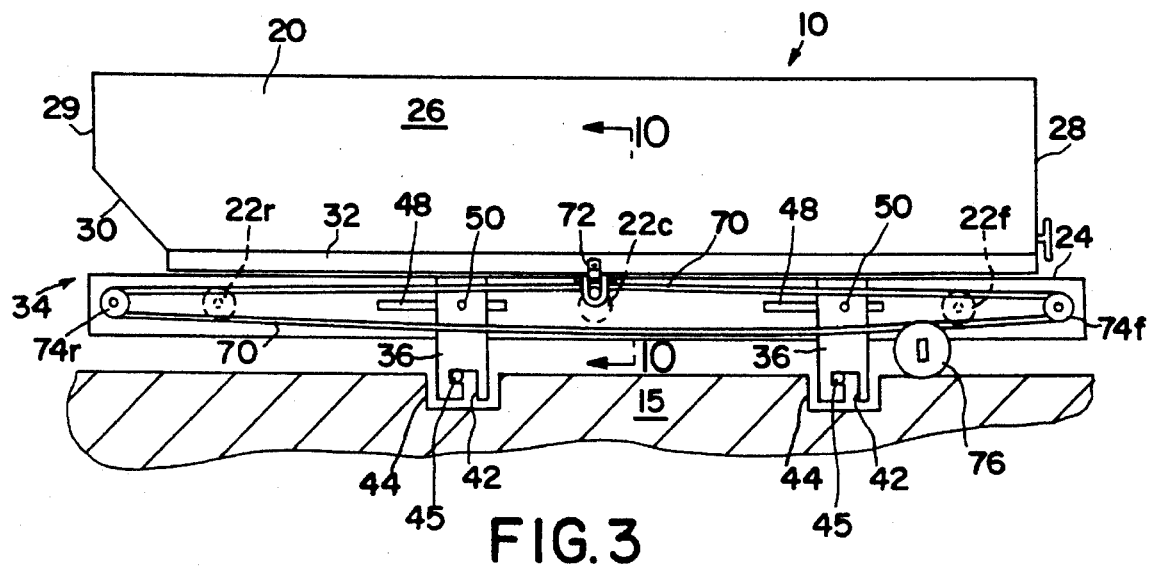
FIG. 3 is a side elevational view partially in section through the storage area of a vehicle and showing the auxiliary mechanism of the present invention installed on the floor of a vehicle as in FIGS. 1 or 2.
Figure 4:
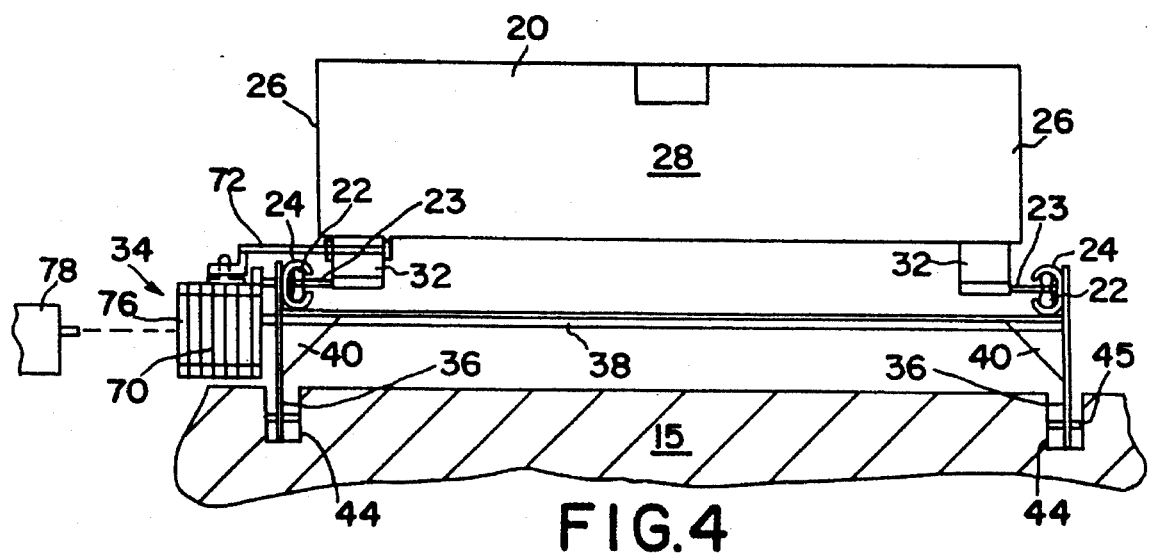
FIG. 4 is a rear elevational view partially in section along the lines 4—4 of FIG. 1 and showing the transverse positioning of the auxiliary mechanism with respect to the floor of the vehicle.

FIGS. 3 and 4 illustrate the auxiliary mechanism 10 of the present invention in side and rear elevation, respectively, with the floor 15 of the vehicle 11 on which it is mounted being shown in section. As here illustrated, the cargo box 20 is in the form of a rectangular box with a bottom plate 25, side plates 26, a front end plate 28, a rear end plate 29 with a sloping surface 30 (to be described hereinafter) and an open top. The box 20 further includes a pair of side support elements 32 for structural rigidity and for the attachment of box support elements as will be described later. The cargo box 20 may be formed of wooden elements as shown here in some cross-sections or may be formed of a unitary structural material such as a plastic that may be produced by injection molding or forming.

Also shown in FIGS. 3 and 4 is the subframe 34 that is mounted to the floor 15 of the vehicle. The subframe 34 includes the pair of channel guides or guide rails 24 one of the pair at each side of the subframe, four support brackets 36 in pairs attached to the guide rails, and at least a pair of cross-members 38 attached to the support brackets 36 by suitable strengthening members 40. The fabrication of the support brackets 36, the cross-members 38 and the members 40 joins these elements by welding or the like to assure that the assembly is sturdy and rigid. The lower end of the support brackets 36 is formed with a locking slot cut-out 42 that is adapted to engage the seat attachment slot 44 and pin 45 assembly in the vehicle floor 15; that slot and pin assembly being used for removably mounting the seats in the vehicle when seats are used. While different vehicles may have different means for removably mounting seats within the vehicle, the structure and form of the support bracket 36 of the present invention will be designed to cooperate and function with whatever is needed for a particular vehicle.

In one form of construction of the guide rails, the connection between the support brackets 36 and the channels or guide rails 24 is shown in FIGS. 3 and 8 where the channel 24 is shown with an axial slot 48 and a suitable bolt structure 50 that will permit the channel 24 to be moved axially with respect to the brackets. Movement of the channel will be described with respect to the description of FIGS. 20, 21 and 22.

Figure 17:
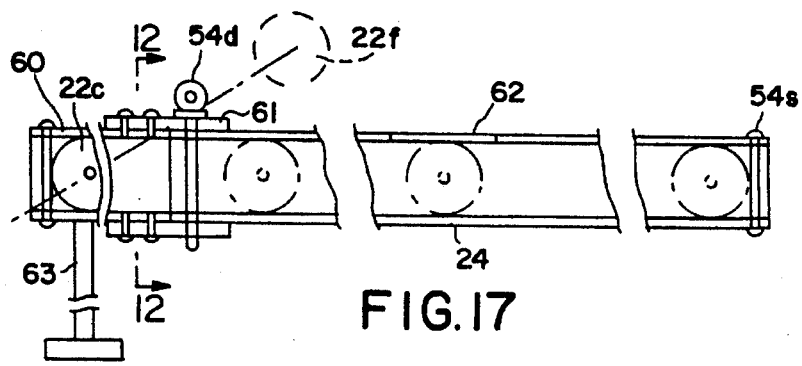

Another form of construction of the guide rails 24 is shown in FIGS. 7 and 17 where the guide rails 24 are adapted to be extended by an extension 60 having the same cross-section formation as the guide rails 24. The extension 60 includes a female coupling structure 61 attached by suitable means to the extension and adapted to enclose the end of a guide rail 24. The extension 60 may be provided with a support bracket or foot 63 that is adapted to engage a portion of the floor 15 of the vehicle or an exterior portion of the vehicle 11 to provide additional support for the guide rails 24 when extended by the extension and when the total load in the cargo box 20 is on the mid set of wheels 22, i.e. two wheels instead of six.

As shown in FIGS. 3, 4, 7, 9 and 10, a plurality of rollers or wheels 22 rotatably supported on shafts 23 are attached to the side support elements 32 of the box 20 by suitable means here shown as brackets 52 enclosing the shafts 23 and screws 49 cooperating with the side support elements 32 of box 20. The rollers or wheels 22 are enclosed within the channels or guide rails 24 so as to support the cargo box 20 for sliding or rolling movement along the channels. As shown in FIGS. 7 and 11 the channels 24 have a plurality of stops 54 positioned along the channels to provide for limiting movement of the cargo box 20 with respect to the channels. Many forms of stop means, such as spring loaded levers or the like, that will accomplish the desired purpose of securing or releasing the auxiliary mechanism in position are contemplated in the present invention. As seen in FIG. 11, the stops may be locking pins 54 adapted to pass through holes 55 through the top and bottom of the guide rails 24. The holes 55 are positioned along the guide rails 24 in position to cooperate with support wheels 22 when those wheels and the cargo box are in particular positions. The positions for the holes and the locking pins will be described hereinafter. A series of these pins 54 positioned along the channel will provide for limiting movement of the wheels in both directions and at prescribed places as well as permitting the box and its wheels to be removed from the subframe channels by rolling the wheels completely out of the channel when the pins are removed.

FIG. 7 illustrates several of the limiting positions of the wheels 22 within the channels 24 with the positions identified by letters A, B and C corresponding to the positions as shown in FIGS. 14–16 and 20–22. It should be understood that the channel 24 as illustrated in the figures is segmented but should be considered as an entire channel of the length shown in FIGS. 3 or 5. Considering the four roller positions illustrated in FIG. 7, rollers 22 are identified as roller 22f the forward roller, roller 22c the center roller, and roller 22r the rear roller. The pins 54 are identified as 54s for stopping the forward movement of the cargo box in stowed position, as 54f for stopping rearward movement of the cargo box, and 54d for alignment of the cargo box in the loading position. Pin 54f is positioned to cooperate with the center wheel 22c in stowed position. Roller 22f at the far right end of the figure illustrates the most forward or inboard roller of an assembled cargo box and is shown in position A. Roller 22c is the center roller and is shown in position A with the roller 22f against pin 54s and roller 22c against pin 54f to limit the position the cargo box at its inner most or stowed position, pin 54f limits cargo box 20 against rearward movement within the storage area 12 of a vehicle. The roller 22r second from the left side of the figure represents the rear roller 22 of an assembled cargo box in position A. When roller 22c is locked in its A position the cargo box cannot move with respect to the channel 24 and, with channel 24 secured within the vehicle to the floor or the subframe, the assembled cargo box cannot move with respect to the storage area.

Figure 22:
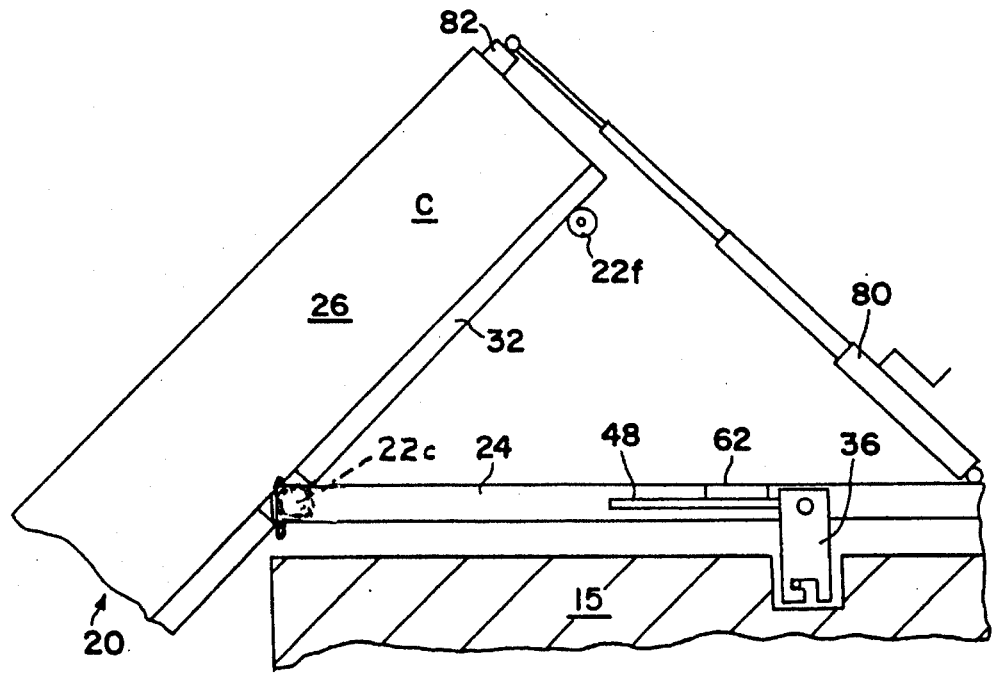

FIG. 7 also illustrates the position of the forward most roller 22f when the cargo box 20 is in position for rotating the cargo box 20 with respect to the channels 24 to permit the cargo box to be moved to the dump position C as shown in FIGS. 1, 17 and 22. For the cargo box 20 to be permitted to tilt with respect to the vehicle floor, the roller 22r must exit from the channel 24 and, the roller 22f must be removed from the channel 24. Removal of roller 22f from the channel 24 is accomplished by providing a cutout portion 62 from the upper surface of the channel 24. In the dump position C the rear pin 54d and the forward stop 54f are initially removed to permit roller 22r to pass out of the channel 24 and then replaced so that the forward roller 22f moves to a stop position against stop 54f in its returned position. Stop 54f is constructed with a shoulder portion that fits into the top of cutout 62 so as to close the cutout and to register the stop with the desired position along the channel 24. The stop 54f may be removed to permit roller 22c to move to contact with stop 54d and to align roller 22f with the now open cutout 62. The forward roller 22f may then be lifted above the channel 24 through the cutout 62 so as to be completely free from the channel 24. As will be described hereinafter, the inner end of the cargo box 20 may then be raised within the storage area 12. In that raised position, the cargo box can be rotated about roller 22c on the channel end at stop 54d and the cargo in the cargo box 20 can slide down the bottom plate 25 of the cargo box.

Movement of the cargo box 20 into and/or out of the storage area 12 and with respect to the channels 24 is accomplished by moving a closed loop cable mechanism driven by a self-locking winch mechanism. The closed loop cable mechanism includes a cable 70 having both of its ends fixed to the exterior of the driving drum 76 of a winch 78. A portion of the cable at about its mid length is fixed by suitable means, such as U-clamp 53, to an extension bar 72 attached by suitable means to one of the side support elements 32 of the cargo box 20, that attachment being preferably at the center of the axial length of the cargo box and parallel to the axis of wheel 22c. The cable 70 passes around a forward pulley 74f at the forward end of channel 24 and around a rearward pulley 74r at the rear end of channel 24. The cable 70 is wrapped in several wraps around the driving drum 76 of a winch 78. The drum may be grooved to accept the cable and maintain the cable in parallel loops around the drum. The winch 78 may be hand powered or motor powered and functions to turn driving drum 76 in either direction of rotation to move the cable 70 and, through the attachment of the cable 70 to the extension bar 72, to move the cargo box 20 either forward or rearward with respect to the storage area 12 of the vehicle 11. The closed loop cable mechanism provides a self-locking controlled movement of the cargo box because the cargo box 20 cannot move without movement of the cable and the cable cannot move without rotation of the winch drum 76. With this closed loop cable mechanism the cargo box 20 can be positioned at any desired position within the storage area and will be held in that position by the cable irrespective of the angular relationship between the vehicle and the horizontal plane.

While the cable, pulleys and the winch have been shown at the outboard side of one of the channels 24 it should be understood that these elements could be mounted between the channels and below the cargo box. The winch may be located in a position to be operated by hand from outside the vehicle 11 by providing access to the drive drum or winch through the side door 18 or remote controls can be connected by electrical cable to the drive motor of a powered winch.

Figure 14:
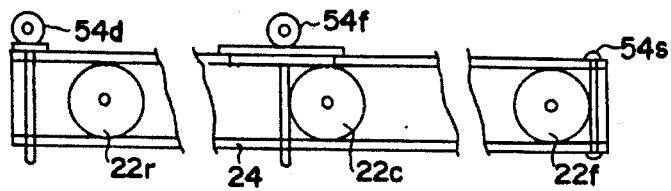
FIGS. 14, 15, 16 and 17 are partial exploded sectional views of the channel guide, rollers and locking stop means in positions of stowed cargo box, loading position, preparation for dumping and extended dumping position.
Figure 15:
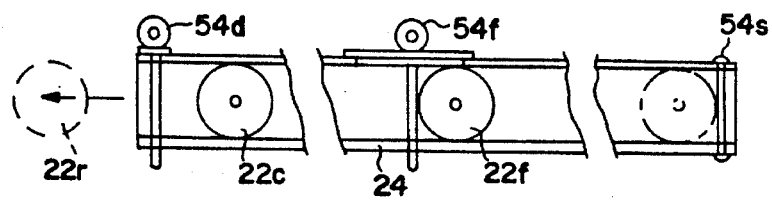
Figure 16:
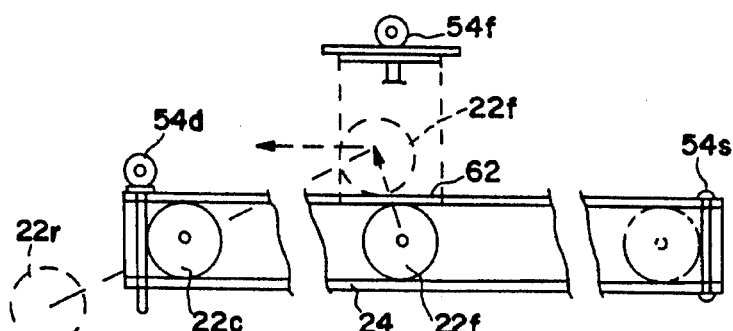
Figure 18:
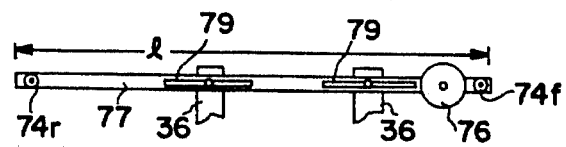
FIGS. 18 and 19 illustrate a cable pully support bar and its adjustable feature for use with the channel extension of FIG. 17.
Figure 19:
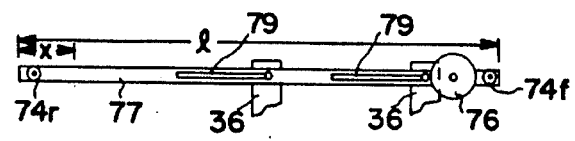

FIGS. 14–17 illustrate the positions of the wheels 22 along channel 24 in the several controlled positions for the cargo box. FIG. 14 illustrates the wheels 22f, 22c and 22r with wheel 22f against stop 54s and wheel 22c against stop 54f. In that position the cargo box would be stowed and prevented from moving forward or rearward. FIG. 15 illustrates the wheels 22c and 22f in the position that will place the cargo box in an extended position from the subframe as in a loading position. In that position wheel 22f is within the channel 24 and wheel 22r (shown in phantom) has exited from the channel. FIG. 16 illustrates the wheels 22c and 22f in position prior to rotation to permit wheel 22f to exit from the channel through slot 62. In this position stop 54f has been removed from the channel and wheel 22c has moved to a stop position against stop 54d. FIG. 17 illustrates the use of an extension 60 to permit the channel to extend for loading or dumping in an alignment that will permit the cargo box to clear the exterior of the vehicle. In this figure the extension 60 is attached to the channel 24 by being engaged to the exterior of the channel and secured by stop 54d that is passed through the inner portion of the extension and the hole used by stop 54d in its normal function. The extension 60 is used as an alternative to the adjustable axial slot 48 in the channel 24 as shown in FIG. 8. With the use of extension 60 the channel 24 is fixed and not adjustable with respect to the subframe 34. When the extension 60 is used it becomes necessary to move the pulley and winching mechanism to place the rear pulley adjacent to the center wheel 22c when it has moved into the extension as shown in FIG. 17. FIGS. 18 and 19 illustrate a winch and pulley assembly for that purpose. As shown, the front pulley 74f, rear pulley 74r and driving drum 76 are mounted to a cable pulley support bar 77 having a length "1" adapted to be mounted, by suitable means, to the support bracket 36. The support bar 77 is provided with axial slots 79 that cooperate with the mounting means to permit the bar to be adjustably positioned a distance "x" with respect to the support brackets and then locked in place by the mounting means. FIG. 18 illustrates the stowed position and FIG. 19 illustrates the extended position. It should be understood that the position of the support bar 77 is to place the rear pulley 74r in alignment with the axis of the wheel 22c when in dumping or loading position in the extension 60.

Figure 20:
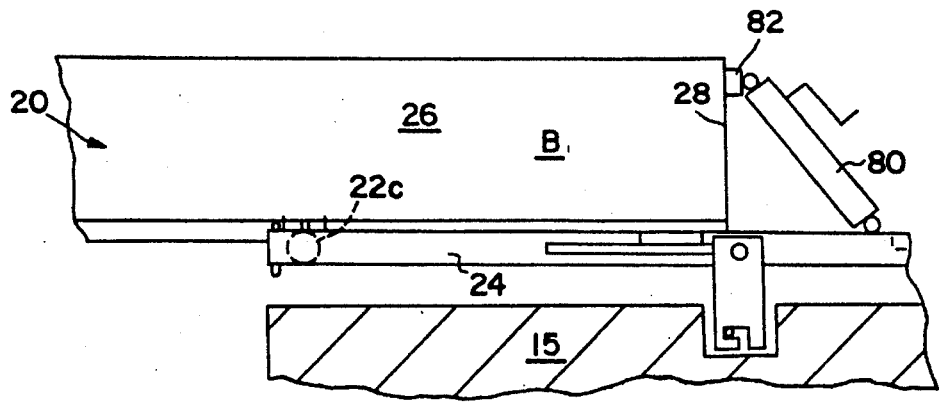
FIGS. 20, 21 and 22 are side elevational views similar to FIG. 3 and illustrating the auxiliary mechanism of the present invention with respect to the floor of the vehicle in three different postions under control of a screw jack mechanism.
Figure 21:
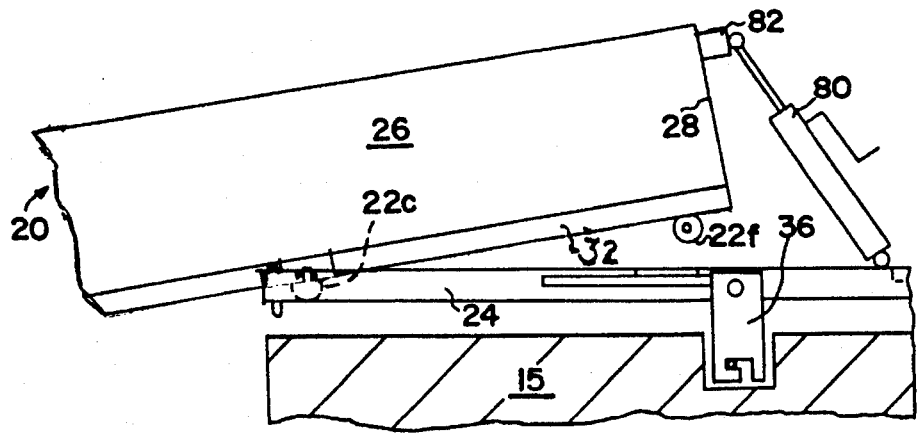

FIGS. 20, 21 and 22 illustrate the cargo box 20 and the subframe assembly 34 in three positions of use for loading and unloading of the cargo box. FIG. 20 illustrates the cargo box 20 with its forward end 28 remaining in or extended only partially into the storage area of the vehicle. In this position, as shown in phantom position B in FIG. 1, the rear of the cargo box 20 is accessible from outside of the vehicle 11 and cargo articles can be placed onto the cargo box from above. In this position of the cargo box, the channels 24 may be slid in a rearward direction along axial slot 48 and pin 50 of FIGS. 3 and 8 and the forward wheel 22f will have been moved rearward along the channel 24 to abut stop 54f but will still be forward of the cutout 62 in the channel and the center roller 22c will remain within the guide rails 24 at the rear. In the form of channel or guide rails 24 as shown in FIGS. 7 and 15, and with the cargo box moved to a loading alignment the forward and center rollers 22f and 22c will be retained within the guide rails 24 and the forward roller 22f will be forward of the cutout 62. The rear roller 22r would have been released from its storage position against stop 54d as the cargo box is moved further to the rear. In the FIGS. 15 and 20 positions, the forward roller 22f will be stopped against pin 54f to limit further rearward movement of the cargo box 20. All of this movement of the cargo box 20 is accomplished under positive self-locking position control of the closed loop cable mechanism.

FIGS. 16 and 21 illustrate the preliminary position of the cargo box, roller wheels and subframe assembly to place the cargo box 20 in position for dumping cargo from the cargo box 20. The extensions 60 must have been installed or the channels have been moved along slot 48 to enable the dump pivot axis roller 22c to be positioned at the rearmost point of the cargo area. When the center roller 22c has been moved to alignment against the rear stop 54d the forward roller 22f is them automatically aligned with the cutout 62 in channel 24 to permit the cargo box 20 to rotate about center roller 22c. Rotation will only take place when the screw jack 80 is actuated. Roller 22f will then rotate upwards with the cargo box, removing roller 22f from the channel 24. Roller 22r is clear of the channel 24 and rotates downward.

As shown in FIGS. 20, 21 and 22 a jacking mechanism 80, here shown as a screw jack which may be hand, hydraulic or electrically operated, is connected to the cargo box 20 at plate 82 on front face 28 of the cargo box and to a portion of the subframe assembly 34 generally at its center or at the center of a cross member 38 or to the floor 15 of the vehicle. Under positive control by the jacking mechanism 80 the interior end of cargo box 20 can be raised and lowered within the storage area to place the exterior end of the cargo box, now outside of the vehicle, at an angle with respect to the cargo area and a surface at the rear and outside of the vehicle. For safety purposes, the screw jack 80 should be connected to the cargo box 20 before the box is moved to its dump position so as to prevent accidental or unintentional rotation of the box around wheels 22c in the channel 24.

FIG. 22 illustrates the cargo box 20 in its fully rotated dump position where cargo articles may be easily slid down the bottom plate 25 of the cargo box 20. In FIGS. 1, 2 and 3 the rear end plate 29 is shown with a sloping surface 30 to provide a surface for engaging a surface at the rear of the vehicle. The rear end plate 29 also functions as a stop for fluid materials that might be contained in the cargo box. It should be understood that the rear end plate may also be hinged at the sloping surface 30 or at the top surface to provide an unimpeded opening to the cargo box.

Return of the cargo box 20 from the dump position to the loading or stowed position is the reverse of the steps shown in FIGS. 14–22. First the cargo box is returned to its position with roller 22f in alignment to reenter through cutout 62. Roller 22f can then be rolled forward to place the cargo box generally level with the channels 24. With the dump stop 54d and the stop 54f opened, the center roller 22c can be moved along the channel 24 and the rear roller 22r can be reentered into the channel 24 at its open rear end. Then box 25 can be moved forward to place all of the rollers 22 in engagement with the channel 24 and stop 54f and 54d can be replaced to secure the cargo box in stowed position as shown in FIG. 7. These movements are accomplished with the screw jack 80 and winch 78. The screw jack is disconnected after wheel 22f has reentered the channel and the screw jack may then be stowed below the cargo box in a disconnected position.

With the FIGS. 3 and 8 construction including slot 48, the subframe then must be returned to the storage alignment of the channels 24 and the support brackets 36 by sliding the channels 24 along the axial slot 48 to their forward position. The subframe should be locked in that position by the locking pin 51 as shown in FIGS. 8 and 9. The forward roller 22f may then be rolled to its stop position against forward stop 54s. The pin 54f can then be engaged with the channel 24 to engage roller 22c and the cargo box will be secure in a storage position. The return of the cargo box to the storage position is also under the control of the closed loop cable mechanism.

The auxiliary mechanism of the present invention may also be adapted for further extension from the storage area of the vehicle by providing extension channels from the channels 24 so that the cargo box 20 may be rolled along the extensions to a position outside of the vehicle. While a relatively short extension 60 is shown, it should be understood that longer extensions are contemplated that would permit the cargo box to be entirely outside of the storage area 12.

The auxiliary mechanism is adapted to be removable from the vehicle as an assembly by removing the support brackets 36 from the attachment slot 44 in the floor 15 of the vehicle. The cargo box 20 may be removed from the subframe as a separate part and the subframe 34 may then be separately removed from the vehicle. Many utility vehicles and vans include a top rack for storage of items. The cargo box of the present invention may be placed on the top rack of a vehicle or may also function as the top rack when removed and attached to the vehicle top. With the subframe and the cargo box transported with the vehicle the auxiliary mechanism may be installed as an assembly at some destination. The seats of the vehicle may be used for passenger transportation, then removed to allow for installation of the auxiliary mechanism at the destination so that the vehicle may then be useful for hauling cargo.

Figure 6:
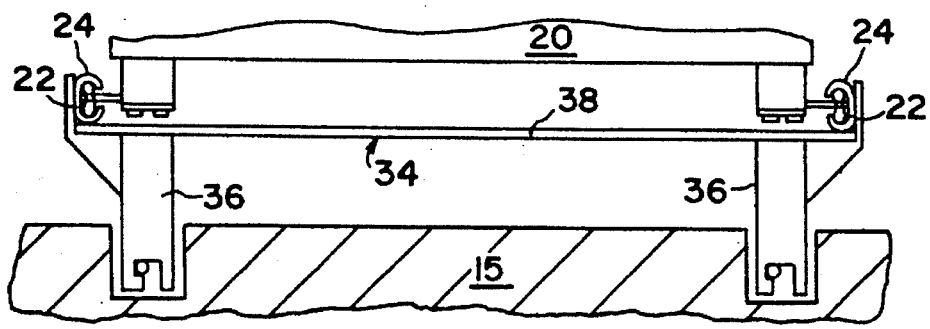
FIG. 6 is a partial sectional view taken along the lines 6—6 of FIG. 5.

FIGS. 5 and 6 illustrate an alternative installation for the auxiliary mechanism of the present invention. In this form the cargo box is aligned to be moved with respect to the vehicle storage area through a side entry/exit opening 18. To accomplish this installation, the subframe 34 is adapted with support brackets 36 that are transverse to the cross members 38 to permit engagement with the attachment slot 44 of the vehicle. The channels 24 are mounted to the subframe 34 in the same manner as the form shown in FIG. 3 and the cargo box 20 is supported in the channels 24 on rollers 22 in the same manner as previously described.

As shown in FIG. 5, the cargo box 20 may be moved transversely with respect to the storage area 12 of a vehicle 11 and may be positioned for loading or dumping as shown in phantom lines. The channels 24 will be provided with the same stops and the cut-out as described with respect to FIGS. 3 and 7. And the moving and dumping mechanisms including the winch system of FIG. 13 and the jacking mechanism of FIGS. 20–22 will be provided and operated in the same manner as previously described.

The auxiliary mechanism of the present invention is adapted for use as a means for transporting a wheelchair, off-road vehicles, gardening implements, strollers or bicycles or the like. The floor of the cargo box, with or without sides, can provide a surface for supporting such goods. A wheelchair can be winched up or driven up the tilted cargo box and locked in place for transport. Unloading from the vehicle is as described in the dumping movements previously described.

It should also be understood that the auxiliary mechanism as described when used with a conventional pick-up truck will require some form of connection adaptations in the bed of the truck. Such adaptations could include a frame attached to the base and side walls of the truck bed with means in that frame for connecting the subframe 34 to the frame.

While certain preferred embodiments of the present invention have been specifically disclosed, it should be understood that the invention is not limited thereto as many variations will be readily apparent to those skilled in the art and the invention is to be given the broadest possible interpretation within the terms of the following claims.

I claim:

1. An auxiliary mechanism adapted for removable installation within a vehicle having an enclosed cargo storage area with a floor and an entry/exit opening directly into said cargo storage area, and wherein said floor of said vehicle storage area includes fixed mounting means adapted for releasably mounting seats in said vehicle, said auxiliary mechanism being adapted to be removably mounted to said fixed mounting means on said floor within said storage area so as to be removably mounted within and movable with respect to said storage area, said auxiliary mechanism comprising:

a) a subframe, means for releasably attaching said subframe to said vehicle comprising locking and support means adapted to cooperate with said fixed mounting means in said floor of said vehicle so as to releasably attach said subframe to said floor of said vehicle within said storage area, b) a pair of spaced parallel guide rails, means for adjustably mounting said guide rails to said subframe with said guide rails extending parallel to said subframe and vehicle floor when said subframe is attached within said storage area and substantially perpendicular to said entry/exit opening, c) a cargo box, said cargo box having at least a bottom and sides and including a plurality of pairs of aligned support wheels adapted to cooperate with said guide rails for support of said cargo box and for permitting travel movement of said cargo box with respect to said floor and said entry/exit opening along said guide rails, d) and means cooperating with said cargo box for positively moving and positioning of said cargo box with respect to said guide rails and said entry/exit opening, whereby said auxiliary mechanism may be removably attached within said storage area of said vehicle without modification of said vehicle and with said cargo box being movable with respect to said floor and said entry/exit opening and being positively positioned along said guide rails.

2. The auxiliary mechanism of claim 1 wherein said means for adjustably mounting said guide rails to said subframe is adapted to permit movement of said guide rails into and out of said vehicle cargo area along said subframe so as to position said cargo box with respect to said vehicle entry/exit opening.

3. The mechanism of claim 1 with said parallel guide rails including travel limiting stops for said wheels along said guide rails and a release opening along said guide rails for permitting movement of at least one pair of said pairs of aligned wheels into and out of said guide rails.

4. The mechanism of claim 1 wherein said cargo box includes three said pairs of aligned support wheels, said wheels being aligned pairs with said one of each pair being at said side of said cargo box and said pairs of wheels being spaced with respect to each other along said cargo box, said pairs of support wheels being adapted to support said cargo box above said guide rails for movement of said cargo box into and out of said vehicle cargo storage area.

5. The mechanism of claim 3 wherein said cargo box is adapted to travel into and out of said entry/exit opening to predetermined limiting positions so as to permit access to said cargo box from outside of said vehicle cargo storage area and to permit predetermined limiting positioning of said cargo box within said vehicle cargo storage area.

6. The mechanism of claim 3 wherein said release opening along said guide rails is spaced from one of said travel limiting stops, said pairs of wheels supporting said cargo box being spaced along said cargo box the same spacing as said space between said release opening and said one of said travel limiting stops along said guide rails, so as to permit said cargo box to be supported on one of said pairs of wheels and to be pivoted about said guide rails on said one of said pairs of wheels when another of said pairs of wheels is released from said guide rails at said release opening.

7. The mechanism of claim 1 wherein said means for positively moving and positioning said cargo box includes a closed loop cable self-locking winch mechanism including a cable, a winch drum, a pair of cable pulleys, and a cable drive bar, said cable being attached to said cargo box at said cable drive bar, said cable passing around one of said cable pulleys at each end of said subframe and being wrapped around and secured to said winch drum at each end of said cable, whereby said cable is maintained in a taught connection to said cargo box and moves said cargo box as one end of said cable is wrapped onto said winch drum and the other end of said cable is unwrapped from said winch drum as said winch drum is rotated.

8. The auxiliary mechanism of claim 1 wherein said vehicle entry/exit opening is at a side of said vehicle and wherein said auxiliary mechanism is adapted for movement with respect to said floor for movement into and out of said side opening.

9. The mechanism of claim 6 with the addition of a mechanical drive means having a fixed end and a movable end, said drive means being attachable at said movable end to said cargo box and at said fixed end to means fixed with respect to said floor of said vehicle cargo storage area for controlled pivotal movement of said cargo box with respect to said vehicle cargo storage area about said pivot on said one of said pairs of said support wheels on said cargo box at said entry/exit opening.

10. The mechanism of claim 9 wherein said mechanical drive means is a screw jack.

11. The mechanism of claim 1 including extension means adapted to be mounted to each of said spaced parallel guide rails for extending said guide rails beyond said entry/exit opening of said vehicle to position said cargo box in position for pivoted movement on one of said pairs of support wheels about said guide rails extension means beyond said entry/exit opening so as to extend the position of said cargo box with respect to said vehicle entry/exit opening.

12. The mechanism of claim 11 with the addition of support means attached to said extension means, said support means adapted to cooperate with a portion of said vehicle in the vicinity of said entry/exit opening so as to stabilize said extension means when attached to said guide rails.

13. The mechanism of claim 1 wherein said means for releasably attaching said subframe to said vehicle includes means for preventing movement of said subframe with respect to said vehicle floor in both forward and reverse direction with respect to said entry/port opening.

14. The mechanism of claim 7 wherein said means for positively moving and positioning said cargo box includes a winch for driving said winch drum.

15. The mechanism of claim 14 wherein said winch is manually driven.

16. The mechanism of claim 14 wherein said winch is power driven.

17. The mechanism of claim 9 wherein said mechanical drive means for controlled pivotal movement of said cargo box is a screw jack mechanism positively connected between said cargo box and said subframe to maintain positive control over pivotal movement of said cargo box about said pivot on said one of said pairs of support wheels.

18. The auxiliary mechanism of claim 1 wherein said cargo box further includes end walls disposed between said side walls, wherein one of said end walls includes a sloping portion and a perpendicular portion adapted to permit said sloping portion to engage a generally flat surface outside of said entry/exit opening when said cargo box is pivoted about said support wheels and into engagement with said flat surface while said perpendicular portion retains cargo within said cargo box.

19. The auxiliary mechanism of claim 1 wherein said vehicle entry/exit opening is at the rear of said vehicle and wherein said auxiliary mechanism is adapted for movement with respect to said floor for movement into and out of said rear opening.

* * * * *